United States Patent
Horgan

(10) Patent No.: US 7,774,497 B2
(45) Date of Patent: Aug. 10, 2010

(54) APPARATUS AND METHOD FOR CLASSIFIER IDENTIFICATION

(75) Inventor: Nick Horgan, Waltham, MA (US)

(73) Assignee: Broadcom Corporation, Irvine, CA (US)

( * ) Notice: Subject to any disclaimer, the term of this patent is extended or adjusted under 35 U.S.C. 154(b) by 413 days.

(21) Appl. No.: 11/819,962

(22) Filed: Jun. 29, 2007

(65) Prior Publication Data
US 2008/0052300 A1  Feb. 28, 2008

Related U.S. Application Data

(62) Division of application No. 10/650,154, filed on Aug. 28, 2003.

(60) Provisional application No. 60/490,165, filed on Jul. 25, 2003.

(51) Int. Cl.
*G06F 15/16* (2006.01)

(52) U.S. Cl. .................. 709/238; 709/245; 370/389; 370/401

(58) Field of Classification Search .......... 709/238–242
See application file for complete search history.

(56) References Cited

U.S. PATENT DOCUMENTS

| | | | |
|---|---|---|---|
| 5,579,307 A | 11/1996 | Richetta et al. | |
| 6,041,053 A | 3/2000 | Douceur et al. | |
| 6,185,568 B1 | 2/2001 | Douceur et al. | |
| 6,892,237 B1 | 5/2005 | Gai et al. | |
| 7,054,315 B2 | 5/2006 | Liao | |
| 7,088,719 B2 | 8/2006 | Brown et al. | |
| 7,239,639 B2 | 7/2007 | Cox et al. | |

(Continued)

FOREIGN PATENT DOCUMENTS

CA  2306364  10/2000

(Continued)

OTHER PUBLICATIONS

S. Sahni et al., Data Structures for one-dimensional packet classification using most specific rule matching, Proceedings International Symposium on Parallel Architectures, Algorithms and Networks, 2002, I-SPAN 2002, May 2002, pp. 1-12.*

(Continued)

*Primary Examiner*—Patrice Winder
(74) *Attorney, Agent, or Firm*—Sterne, Kessler, Goldstein & Fox PLLC

(57) ABSTRACT

A method for classifying an incoming packet. The method includes maintaining a database associated with patterns of fields, where the fields can be network addresses. The database can be developed by mapping each pattern to a unique numeric identifier. The number of unique numeric identifiers is equal to the number of patterns, and the size of each unique numeric identifier is substantially smaller than the field of each pattern. The database can be further developed by determining a range of one or more of the unique numeric identifiers to be associated with each pattern. The range for each pattern can be bounded by a minimum unique numeric identifier and a maximum unique numeric identifier. The method also includes using a field of the incoming packet to determine an associated identifier for that field, where the associated identifier is equal to one of the unique numeric identifiers. The associated identifier can then be matched with one or more of the ranges for the patterns, and the method can then determine how to process the incoming packet.

15 Claims, 9 Drawing Sheets

U.S. PATENT DOCUMENTS

| | | |
|---|---|---|
| 7,251,651 B2 | 7/2007 | Lunteren |
| 7,356,695 B2 | 4/2008 | LiVecchi |
| 7,523,218 B1 * | 4/2009 | Sahni et al. .................. 709/238 |
| 2002/0009076 A1 * | 1/2002 | Engbersen et al. .......... 370/392 |
| 2003/0123452 A1 | 7/2003 | Cox et al. |
| 2004/0264373 A1 | 12/2004 | Engbersen et al. |
| 2005/0021491 A1 | 1/2005 | Horgan |

FOREIGN PATENT DOCUMENTS

| | | | |
|---|---|---|---|
| WO | WO 99/00946 | A2 * | 1/1999 |
| WO | WO 02/052442 | A2 * | 7/2002 |
| WO | WO 03/063427 | A1 * | 7/2003 |

OTHER PUBLICATIONS

Haibin Lu et al., O(log n) dynamic router-tables for ranges, Proceedings 8th IEEE International Symposium on Computers and Communications, 2003, ISCC 2003, vol. 1, pp. 91-96.*

International Search Report issued Jul. 16, 2008 for Appl. No. PCT/US2004/23370, 3 pages.

* cited by examiner

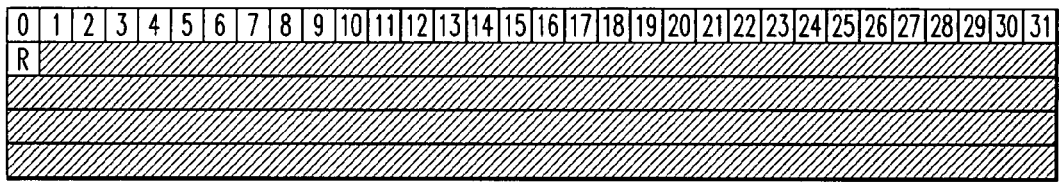

FIG.6

| Field | Layer | Operation | #Header Bits | #Pattern Bits | Notes |
|---|---|---|---|---|---|
| SA | 3 | Mask/Data | 32 | 64 | Each header bit requires a pattern mask and pattern data bit. |
| DA | | Mask/Data | 32 | 64 | |
| Protocol | | FieldMask/Data | 8 | 9 | The mask for these fields may be applied to all bits in the field simultaneously. |
| TOS | | FieldMask/Data | 8 | 9 | |
| SP | 4 | Range | 16 | 32 | Since a range requires a low limit and a high limit, the pattern bits must specify these limits. |
| DP | | Range | 16 | 32 | |
| TCPCtrl | | Flag | 6 | 6 | A flag only requires a single pattern bit that indicates either the value of flag is a don't care or it must be set for the rule to match. |
| Total | | | 120 | 216 | |

Labels on table: 710, 720, 730, 740, 750 (columns); 752, 754, 756, 758, 760 (left rows); 772, 774, 776, 778, 780 (right rows)

FIG.7

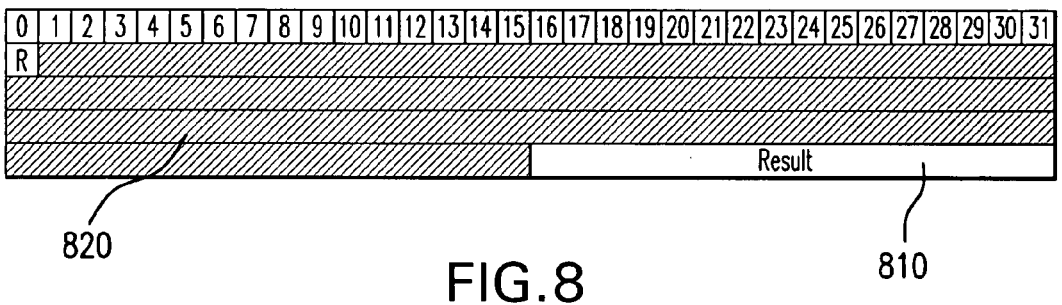

FIG.8

| 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| M | Set[4:0] | | | | | Filter[8:0] | | | | | | | | |

Instruction[521:0]

| Opcode[2:0] | HeaderBitSel[6:0] | Pattern[511:0] |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | M | Set[4:0] | | | | | Filter[8:0] | | | | | | | | |

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| SSeL | | | TCPCtrl | | | | | Protocol | | | | | | | | TOS | | | | | | | | | | | | | | | |
| DAC1SID | | | | | | | | | | | | | | | | SAC1SID | | | | | | | | | | | | | | | |
| DP | | | | | | | | | | | | | | | | SP | | | | | | | | | | | | | | | |
| | | | | | | | | | | | | | | | | R | | | | | | | | | | | | | | | |

FIG.13

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| SSeL | | | TCPCtrl | | | | | Protocol | | | | | | | | TOS | | | | | | | | | | | | | | | |
| DMACC1sID | | | | | | | | | | | | | | | | SMACC1sID | | | | | | | | VLANID | | | | | | | |
| DP | | | | | | | | | | | | | | | | SP | | | | | | | | | | | | | | | |
| EtherType | | | | | | | | | | | | | | | | R | | | | | | | | | | | | | | | |

FIG.14

APPARATUS AND METHOD FOR CLASSIFIER IDENTIFICATION

CROSS REFERENCE TO RELATED APPLICATIONS

This patent application is a divisional of U.S. patent application Ser. No. 10/650,154, filed Aug. 28, 2003, entitled "Apparatus and Method for Classifier Identification," which claims the benefit of Provisional Application Ser. No. 60/490,165 filed Jul. 25, 2003, entitled "Apparatus and Method for Classifier Identification," all of which are incorporated herein by reference in their entirety.

BACKGROUND OF THE INVENTION

1. Field of the Invention

The present invention relates generally to a method and system for packet classification, and more particularly to such methods and systems that efficiently classify packets.

2. Related Art

Packet classification is a necessary precursor to providing security and Quality of Service (QoS) guarantees in advanced network applications. Packets are pieces of information transmitted over a packet-switched network. In addition to data, a packet contains the destination address that defines where the packet is to be delivered and frequently the source address, which indicates where it originated (this address information is typically contained in a "packet header"). Generally, packet classification relates to filtering packets that are to be processed differently from other packets in a network, and then processing those packets in a proscribed way.

Packet classifiers are used in routers, switches, and similar devices to perform these functions of filtering and processing packets. Packet classifiers receive packets to be routed and compare them to a list maintained by a system administrator. If a match is made, the packet is processed in a prescribed manner.

A common requirement in packet classification is for routers to classify packets based on information in packet headers. A packet header contains several fields that contain a variety of information, such as the source and destination addresses, protocols, flags, and type of service. Packets are classified into equivalence classes called flows, which are defined by rules. For example, a flow might be a set of packets that have source addresses that start with the prefix bits S, protocols that are TCP, and that are to be sent to the server port for web traffic. Each flow can have an additional processing instruction associated with it. Examples of instructions include sending a packet to a specific queue, dropping the packet, or copying the packet.

Packet classification must perform at rates approaching 15 million-packets/sec in 10 gigabit/sec Ethernet networks. For a typical packet classifier in a worst-case scenario, each packet must be compared to each rule before a result can be determined. Given "N" rules, this would result in 15×N million comparisons that must be made per second by the packet classifier. Presently, N typically is on the order of 1000. However, as the demands on the Internet become more complex, N could approach 100,000 in the near future. Such a large number of rules would require 1.5 trillion comparisons per second in a typical packet classifier. Additionally, the comparisons used in packet classification are non-trivial consisting of equality and range checking across a plurality of header fields.

SUMMARY OF THE INVENTION

One embodiment of the invention is a method for classifying an incoming packet. Such a method can be used, for example, in IPv4 or IPv6 packet matching. The method includes maintaining a database associated with patterns of fields, where the fields can be network addresses. According to one aspect of the invention, the database can be maintained in a trie data structure. The database can be developed by mapping each pattern to a unique numeric identifier. The number of unique numeric identifiers is equal to the number of patterns, and the size of each unique numeric identifier is substantially smaller than the field of each pattern. The database can be further developed by determining a range of one or more of the unique numeric identifiers to be associated with each pattern. The range for each pattern can be bounded by a minimum unique numeric identifier and a maximum unique numeric identifier. The method also includes using a field of the incoming packet to determine an associated identifier for that field, where the associated identifier is equal to one of the unique numeric identifiers. The associated identifier can then be matched with one or more of the ranges for the patterns, and the method can then determine how to process the incoming packet.

Another embodiment of the invention is an apparatus for packet classification that is uniquely suited to the method of the first embodiment. In this embodiment, a plurality of simple processing elements are organized and controlled in such a manner as to effect packet classification operations under programmed control. One capability of this embodiment is the enabling of numerical range operations—i.e. determining that a field lies numerically between two target values.

Yet another embodiment of the invention provides a mechanism that utilizes data in a classification record of an incoming packet to select a classification program segment that is applied directly to the classification record. This mechanism has two features. First, it features maintaining a first set of binary patterns and a second set binary patterns. In this embodiment, one of the sets of binary patterns can be used during operation for packet classification, and the other set of binary patterns can be updated by a system administrator. The two sets of binary patterns can then be switched in order to provide for seamless updating of patterns. Second, it features selection of a segment of the classification program with respect to data contained in the packet header, or classification record.

Other embodiments of the invention feature systems configured to perform the methods set forth above.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

FIG. 1b is a block diagram illustrating the creation of the database that can be used in connection with the embodiment of FIG. 1a.

FIG. 6 is a block diagram illustrating an unformatted 128-bit classification record.

FIG. 7 is a table derived from the classification record of FIG. 5.

FIG. 8 is a block diagram showing the result rewrite into a classification record.

FIG. 9 is a block diagram illustrating the format of the classification result.

FIG. 10 is a block diagram depicting the instruction format.

FIG. 11 is a block diagram of the classification result with an additional field representing priority mach status.

FIG. 12 is a table illustrating an exemplary classification program structure.

FIG. 13 is a block diagram of the classification record with field compression.

FIG. 14 is a block diagram of another embodiment of the classification record with field compression.

Figure 1A:
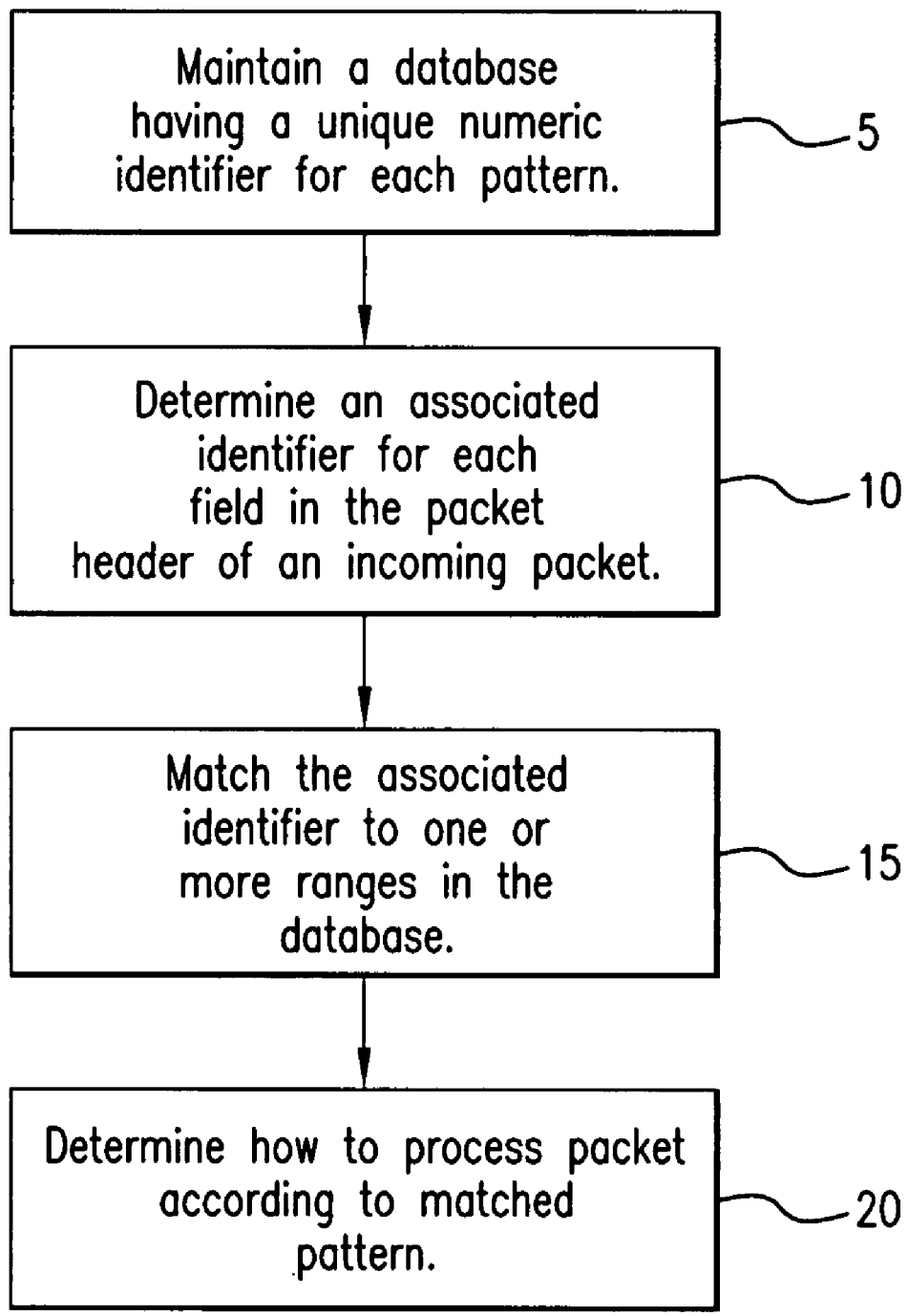
FIG. 1a is a block diagram illustrating the functioning of one embodiment of the invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

A. Methods for Classifying Packets

The embodiments of the invention provide for efficient packet classification in a network. The invention utilizes a method of minimizing the number of comparisons by remapping long fields (such as network addresses) to shorter numeric identifiers. The numeric identifiers are used in comparisons in lieu of the full fields. By leveraging a decrease in the number of computations required, power and cost can be saved, and the size of the footprint of the packet classifier can be decreased for a given number of rules.

According to one aspect of the invention, a method and system for packet classification is provided. In this embodiment, a packet classifier maintains a set of rules to be enforced. Each rule has a pattern of a field contained within it. The fields (such as addresses) can be matched with an address found within the packet header of an incoming packet. In one embodiment, a unique numeric identifier, called a classifier identifier, is used to identify each of the fields in the set of rules to be enforced. Classifier identifiers are assigned in accordance with the number of patterns contained within the rule set (that is, each pattern is assigned a unique classifier identifier). Accordingly, given "N" patterns, which can be maintained in rules, N classifier identifiers will be assigned. Specifically, each classifier identifier assignment is derived from the address (or addresses) associated with the rule, which is described in greater detail below. The fields can be, in one embodiment, network addresses, although the invention is not limited in application to network addresses.

FIG. 1a is a block diagram depicting the operation of this embodiment of the invention. In the embodiment of FIG. 1a, a first database is maintained providing an assignment between address prefixes in patterns and a uniquely assigned numeric identifier. This is depicted in block 5. This database can, in one embodiment, be implemented using a trie data structure. Each pattern is then assigned a range of the unique numeric identifiers that correspond to that pattern.

An independent data structure is also maintained, and this data structure is used to provide an associated identifier for each independent field (such as an address) of the packet header of an incoming packet. Block 10 depicts this act. This act can be considered a preprocessing step to packet classification per se.

The associated identifier(s) for the incoming packet are then compared to the ranges assigned to patterns in the first database. If the associated identifier falls within one or more of these ranges, a priority computation module can be used to determine which of the rules will be enforced. FIG. 1a depicts this act of comparing associated identifiers with ranges for patterns with block 15. If the incoming packet does match, it is processed accordingly as depicted in block 20 of FIG. 1a.

1. Remapping Patterns

As set forth in FIG. 1a, a database having a unique numeric identifier for each pattern is developed. The unique numeric identifiers, which can also be referred to as classifier identifiers, are used in matching an incoming packet to a rule. The packet classifier need only concern itself with the N addresses (i.e., patterns) found within the rule set. In this embodiment of the invention, the number of bits necessary to express each of the classifier identifiers is equal to the largest integer greater than $\log_2 N$. Common fields subject to classification are the IPv4 destination and source address fields and the IPv6 destination and source address fields. These addresses range in size from 32 bits (IPv4) to 128 bits (IPv6) in length. Therefore, typical packet classifiers generally compare 32 bits (e.g., IPv4) for each rule comparison. In the present embodiment of the invention, however, the packet classifier only compares $\log_2 N$ bits. This can result in a substantial savings in computational comparisons.

In typical classification applications (in routers and switches) the destination addresses of incoming packets require examination to determine where the packet is to be sent next. The mechanisms for achieving this examination are the mechanisms on which the current embodiment builds to determine the unique classifier identifiers for patterns. There are many such mechanisms that are used for examination of destination addresses of incoming packets, including software data structures such as the familiar trie and hardware mechanisms such as TCAMs. Furthermore, routers and switches often perform a source address validity check, which generally requires a similar look-up as is the case with the destination addresses.

As an example, assume a packet classifier maintains a database of 1024 rules. At most, the rule database can have 1024 different address prefixes—one for each rule. No matter how long the network addresses are in the rule database, the database can simply refer to each of the address prefixes as "0-1023." That is, one number is assigned to each address prefix. The required number of bits to refer to each of these network addresses is 10 (i.e., $2^{10}=1024$).

During operation, a uniquely selected 10-bit number (called an associated identifier) is associated with the destination prefix of an incoming packet in the destination address lookup structure. The same is done with respect to the source address lookup structure. For IPv4 addresses, the required number of bit comparisons drop from 64 bits down to 20 bits—a significant gain of 44 bits. And for IPv6 addresses, the required comparisons drop from 256 bits to 20 bits.

With present bandwidth rates approaching 15 million-packets/sec in Ethernet networks, if N=1024 rules and N=1024 patterns, a typical packet classifier must perform approximately 15 billion-classifications/sec. Each classification is performed over several fields that usually include the destination and source addresses. The number of individual bits to be examined in (for instance) IPv4 destination and source addresses is 32 bits each, or 64 bits in total. Using the present embodiment of the invention, however, if N=1024 rules and N=1024 patterns, the comparisons per rule are reduced from 64 bits to 20 bits. This represents a gain of almost 68% over these important fields. For IPv6 the gain is of the order of 92% (256 address bits down to 20).

The process by which classifier identifiers are assigned to patterns will now be described. Addresses contained in the rule set (i.e., in the patterns) are assigned classifier identifiers using this process. In addition, the addresses found within the packet headers of incoming packets are also associated with associated identifiers using a look-up procedure. The process by which classifier identifiers can be assigned to addresses contained within the rule set will be described first. The addresses contained within the rule set will be referred to as "patterns" throughout this specification, and the addresses contained within packet headers of incoming packets will be referred to as "strings."

After a user defines a rule set, a database is developed to assign a unique numeric identifier to each pattern in the rule set. The unique numeric identifier is smaller in length than the length of each pattern. In one embodiment, the database is a trie developed using the patterns of the rule set. The trie is created before any operation of the packet classifier begins on incoming packets.

Figure 1B:
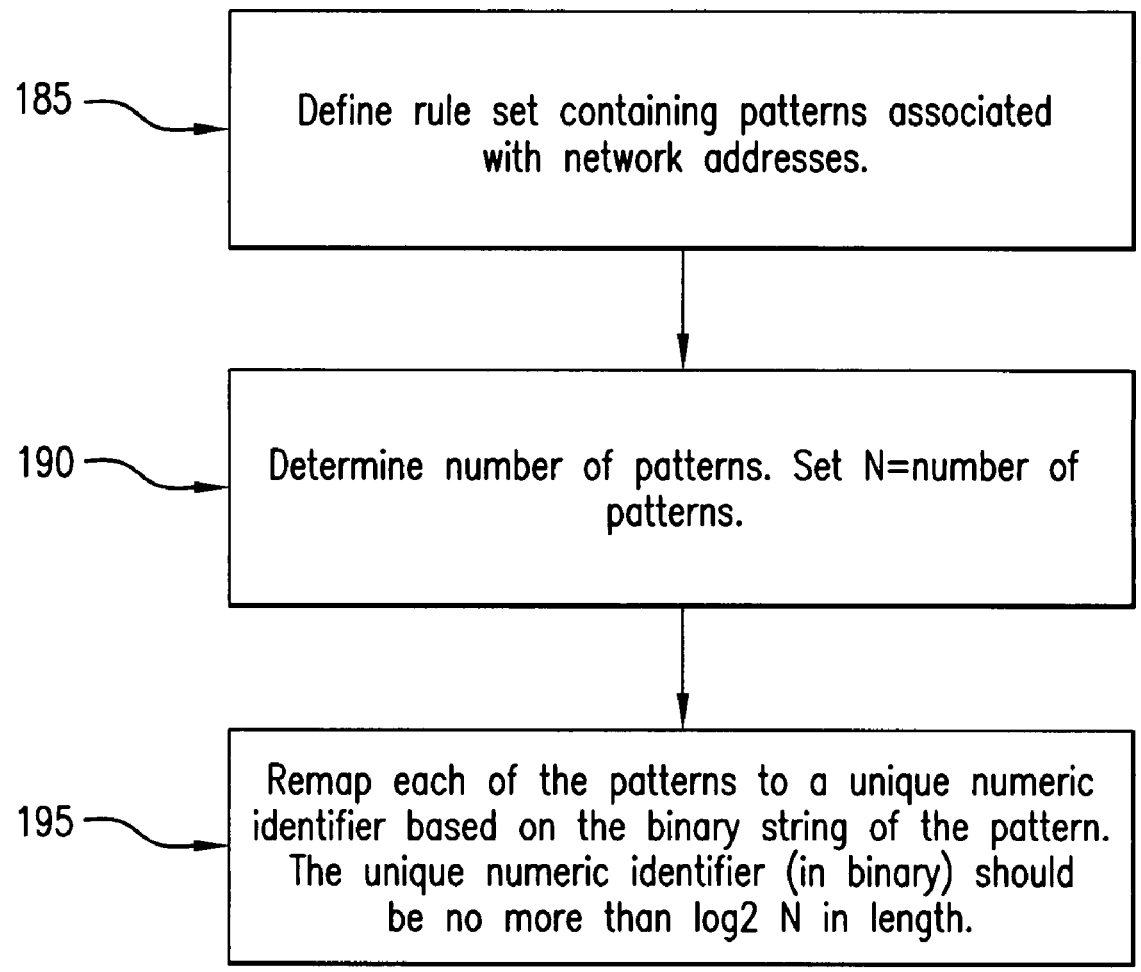

FIG. 1b depicts a block diagram of one process that can be used to develop a database using the patterns according to one aspect of the invention. The first step 185 in the process is for a user (e.g., a network manager) to define a set of rules. Each rule has a pattern (e.g., a network address) contained within it. The next step 190 is to determine the total number of unique patterns found in the rules. The last step 195 is to map each of the patterns to a unique numeric identifier. The assignment of the unique numeric identifier is based on the binary string of the pattern. Each of the unique numeric identifiers is no greater in length than the smallest integer greater than $\log_2 N$, where N is the number of unique patterns in the rule set.

Figure 2A:
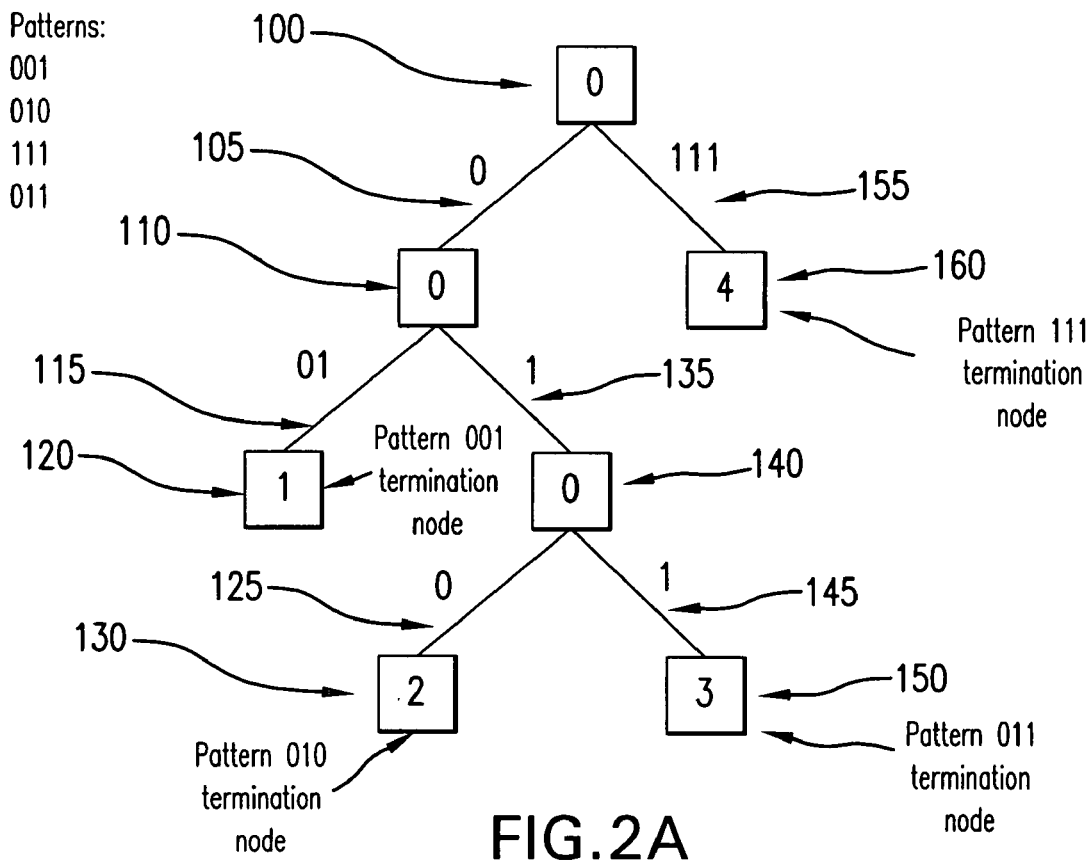
FIG. 2a is a block diagram of a trie constructed according to one embodiment of the invention.

FIG. 2a illustrates the creation of a trie having four patterns, with three bits in each pattern. The depiction in FIG. 2a is for a trie for the following patterns:

001
010
111
011

The process uses a binary decision trie. Each pattern is analyzed from left to right (that is, highest bit first). Nodes 100, 110, 120, 130, 140, and 150 are represented by boxes. The numbers in the nodes are classifier identifiers. Nodes are connected to each other by decision paths 105, 115, 125, 135, 145, and 155. Each decision path has an associated binary number. The trie is created sequentially from left to right, starting with the pattern having the lowest value and ending with the pattern having the highest value. For example, the first decision path, if applicable, branches from a root node to a child node on the left hand side. This decision path is associated with the highest bit equaling "0" for all of the patterns. Therefore, all patterns that begin with "0" would traverse this decision path. Before traversal, the nodes do not have classifier identifiers assigned to them. The pattern with the lowest numerical value is the first to traverse the trie.

Node 100 in FIG. 2a represents the decision point of the first bit. If the first bit is a "0," then the pattern traverses the decision path 105 that has "0" associated with it (that is the case for the patterns "001," "010," and "011"). If the first bit of the prospective pattern is a "1," then the pattern traverses the decision path 155 (this is the case for the pattern "111"). Nodes that do not result in the termination of a pattern are assigned the classifier identifier "0." A node with a "0" does not correspond to any pattern in the rule set. In the example of FIG. 2a, "001" is the first pattern to traverse the trie. The pattern "001" begins at the top node 100, and because the node does not result in the termination of a pattern traversal, node 100 is assigned the classifier identifier "0." Because the first bit of the pattern "001" is "0," the pattern traverses decision path 105.

Node 110 is assigned classifier identifier "0" because pattern "001" does not terminate at node 110. In accordance with the previous decision step, pattern "001" traverses decision path 115 and terminates at node 120. It should be noted that parent nodes that have singular children nodes are removed for illustrative purposes, and the parent decision paths reflect this abbreviation. Thus, decision path 115 has the binary string "01" associated with it. Pattern "001" runs out of bits at node 120 and terminates. Accordingly, node 120 is assigned classifier identifier "1," which uniquely identifies pattern "001."

A similar traversal occurs with the next pattern "010," which is the smallest remaining pattern. Pattern "010" traverses through nodes 100, 110, and 140 before terminating in node 130. Node 130 is therefore assigned classifier identifier "2." Similar traversals occur exhaustively until all patterns have been assigned classifier identifiers. For example, pattern "011" traverses nodes 100, 110, and 140 before terminating in node 150. Node 150 is therefore assigned classifier identifier "3." Finally, pattern "111" traverses through node 100 before terminating in node 160. Node 160 is therefore assigned classifier identifier "4."

In the example of FIG. 2a, N=4. As set forth above, the number of bits required to refer to these four addresses is $\log_2 N$ bits. In this example, therefore, only two bits are required to refer to the four rules. In addition, because N=4, there are four unique classifier identifiers associated with the trie of FIG. 2a.

Figure 2B:
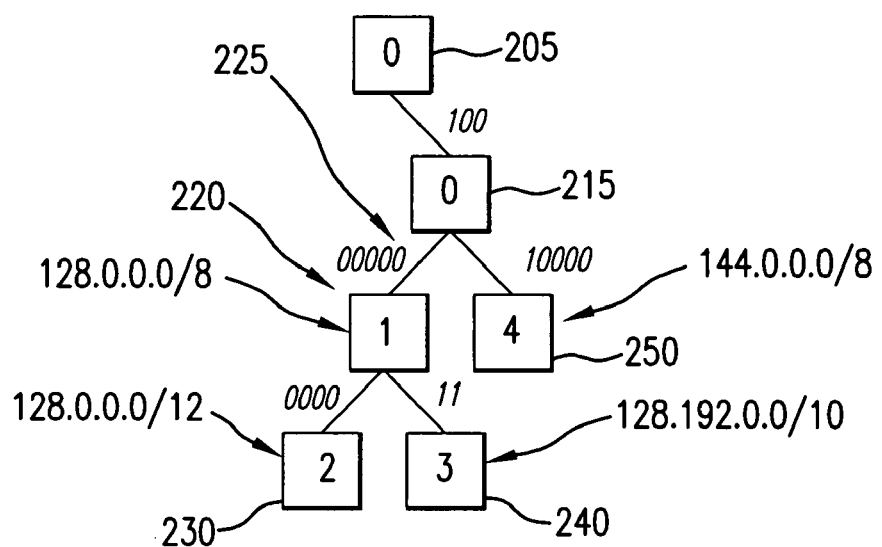
FIG. 2b is a block diagram of a second trie constructed according to one embodiment of the invention.

FIG. 2b depicts a trie constructed with classifier identifier assignments for the following four patterns derived from IPv4 addresses:

128.0.0.0/8=0b10000000
144.0.0.0/8=0b10010000
128.0.0.0/12=0b10000000.0000
128.192.0/10=0b10000000.11

The patterns represent the subnet mask of each 32-bit IP address. For example, the pattern for 128.0.0.0/8 is the first eight bits of the address (i.e., "10000000"). Similarly, the pattern for 144.0.0.0/8 is the first eight bits of the address (i.e., "10010000").

As with the example of FIG. 2a, classifier identifiers for the embodiment of FIG. 2b can be assigned sequentially in a depth-first, pre-order traversal of a binary trie (that is, a trie where each node represents a common string prefix) representing the patterns. In FIG. 2b, the numbers in the nodes are the classifier identifiers, and the edges are labeled with the substrings (in binary) to traverse them. The trie can have intermediate nodes that are branching points not associated with any pattern. A node that is associated with a pattern is referred to as a "terminal" node.

Nodes assigned the "0" classifier identifier that have only singular children nodes have been removed from FIG. 2b for brevity. The binary numbers associated with the removed decision paths are absorbed by the parent decision paths. For example, instead of the "00000" string in decision path 225, the decision path 225 could be represented by a sequence of five nodes, each having a "0" classifier identifier and each having a "0" associated with each of the decision paths.

After construction of the trie data structure, it is traversed in order to assign appropriate classifier identifiers to each pattern. The method of traversal can be the well-known depth-first traversal algorithm. This traversal provides a mechanism that disambiguates address predicates in rule matching and allows for a number of mechanisms that enables checking ranges of classifier identifiers for each pattern.

The execution of a depth-first pre-order traversal of the trie represented in FIG. 2b proceeds as detailed below. The traversal essentially enumerates the terminal nodes of the trie.

The root node (205) is not a terminal node, so it is assigned the number "0." The set of the root node's children is determined. This set will have 0, 1 or 2 members—by convention. When it has 2 members the first member is the numerically lesser of the two members. In FIG. 2b, the only child of the root node is node 215. This is not a terminal node, so we assign it the number "0."

The set of children of node 215 contains nodes 220 and 250. We visit the "first" member of this set (node 220). Node 220 is a terminal node and is the first encountered, so it is assigned the number "1," and the set of its children (nodes 230 and 240) is then examined.

Node 230 is the first of node 220's children, and node 230 is a terminal node. Because it is the second terminal node encountered, it is assigned the number "2" (indicating that it is the second terminal node encountered in the depth-first traversal). Node 230 has no children, so this path terminates.

Node 240 is the second of node 220's children, and is also a terminal node. Because it is the third terminal node encountered, it is assigned the number "3." Node 240 has no children, so this path terminates.

Returning to node 215, the second of its children has yet to be enumerated. Node 215's second child is node 250, and it is the fourth terminal node encountered and hence is assigned "4."

In the example of FIG. 2b, N=4. The number of bits required to refer to these four addresses is $\log_2 N$ bits, or two bits. In addition, because N=4, there are four unique classifier identifiers associated with the patterns shown in FIG. 2b.

IP addresses can be contained within other addresses. This also occurs in the patterns of the rule set. In the example of FIG. 2b, EP addresses 128.0.0.0/12 and 128.192.0.0/10 are contained within 128.0.0.0/8. To reflect this, ranges for each pattern are determined and tabulated. The classifier identifier assigned to each pattern must be included within the range. Moreover, the classifier identifiers of the children nodes must be included within the pattern range.

These criterion are satisfied by using the following method to determine the pattern range. The classifier identifier assigned to the pattern is chosen to be the lower bound for the pattern range. The upper bound is the maximum classifier identifier beneath it (i.e., the children nodes beneath it). This ensures that more specific patterns under a general pattern will also match the general pattern even though the classifier identifier corresponds to the more specific pattern (e.g., if other fields in the pattern do not match).

Figure 3:
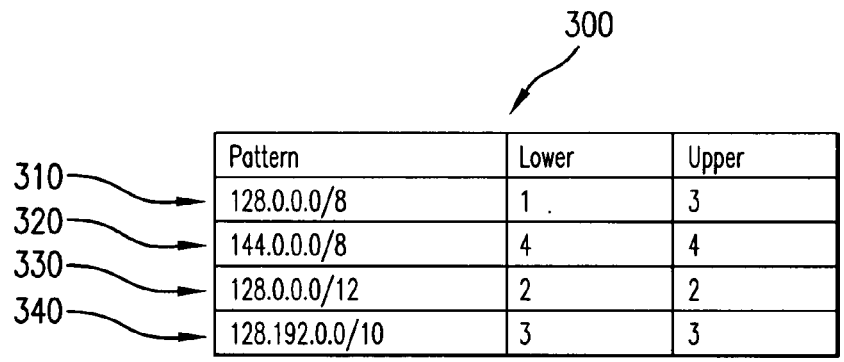
FIG. 3 is a table showing pattern ranges corresponding to the terminating nodes of the trie of FIG. 2.

FIG. 3 shows classifier identifier ranges for each pattern in the example set of FIG. 2b. Referring to FIG. 3, pattern range 310 is shown to include a range from 1 to 3. Referring back to FIG. 2b, it can been seen that pattern range 310 includes the classifier identifier of the parent node (itself) 220 and of its children nodes 230, 240. Pattern ranges 320, 330, and 340 have a range of one classifier identifier because the nodes associated with the respective ranges do not have children nodes branching from them. Hence, the classifier identifier of the node is both the upper bound and the lower bound. After the ranges are determined, the packet classifier is ready to operate.

Ranges are used to determine if a string of an incoming packet applies to more than one rule. Therefore, when a range is assigned to each of the patterns, it can be important that the range contains not only the classifier identifier assigned to the pattern, but also the classifier identifiers of its children nodes. The previous embodiment uses the classifier identifier as the lower bound of the range of the associated pattern, although nothing precludes the classifier identifier as being the upper bound of the range of the pattern. Any scheme that captures this functionality is within the scope of the invention.

The following code, when executed, can be used to enumerate the trie with classifier identifiers. This code is exemplary, and such a trie can be created by using other code or methods as well.

before traversal begins: currentClsId=0, nextClsId=1, visitRoot( ), if the node doesn't correspond to a pattern: push(currentClsId), node.clsId=currentClsId, visitChildren(node), currentClsId=pop( ), otherwise: push(currentClsId), currentClsId=nextClsId, nextClsId=nextClsId+1, node.clsId=currentClsId, visitChildren(node), currentClsId=pop( ).

2. Operation for Classifying Packets

Referring again to FIG. 1a, one method for packet classification will be described in greater detail. The first step 5 in FIG. 1a includes maintaining a database having a unique numeric identifier for each unique pattern in the database. Specifically, as set forth above, the database can include an array of lengthy patterns to be matched (e.g., addresses in this example). The database maintains a corresponding array of shorter unique numeric identifiers that corresponds to the array of patterns—with one unique numeric identifier for each pattern. For example, let the array of database patterns consist of the following array: 128.0.0.0/8, 128.0.0.0/12, 128.192.0.0/10, and 144.0.0.0/8. The database renumbers the array and refers to the patterns as 1, 2, 3, and 4, respectively, which it stores in a new array. The members of the new array are called "unique numeric identifiers" or "classifier identifiers." Each unique numeric identifier implicitly refers back to the originating pattern from which it was derived. Section A.1 above discusses the creation of such an array of patterns in greater detail. In addition, as set forth above, classifier identifier ranges for each pattern are determined.

When a packet arrives at the ingress of a packet classifier, the packet contains a packet header that includes address information. In operation of this embodiment, incoming packets are received by a pre-processor, where the packet header is stripped from the packet. Network addresses contained within the packet header are identified. An attempt is then made to associate an associated identifier to each of the network addresses in the header by traversing a second database, which can, but need not be, similar to those discussed above in connection with FIG. 2a or FIG. 2b. In one embodiment, the pre-processor performs a Longest-Prefix Match (LPM) and attempts to assign an associated identifier to each network address.

The second step 10 in FIG. 1a, therefore, is a traversal of a second database using the address(es) of an incoming packet (that is, the source and destination addresses). This second database may or may not be similar to the structure that was used to perform the assignment of unique numeric identifiers to the field patterns. This second mechanism can be any mechanism that enables an association of the appropriate packet field of an incoming packet with the unique numeric identifiers assigned to patterns by the earlier described mechanism. In other words, an "associated identifier" is assigned to each field (i.e., source and destination address in one example) of the incoming packet. This second database can include, but is not limited to, software data-structures such as tries or lists and hardware mechanisms such as ternary addressable content addressable memories (TCAMs). The association of an associated identifier to a field of a packet header can therefore be carried out with a number of mechanisms.

The third step 15 in FIG. 1a involves matching the associated identifier assigned to the network address of the incoming packet with one or more patterns using a range of values associated with each of the patterns. If the associated identifier assigned to the incoming packet falls within one or more of the pattern ranges, then a match is made. The associated identifier associated with the input string is now tested against the ranges for each pattern (lower bound<=classifier identifier<=upper bound). For example, referring to FIG. 3, if the associated identifier assigned to the network address is "3," then this network address falls within ranges 310 and 340. Therefore, this network address matches the rules associated with patterns 128.0.0.0/8 and 128.192.0.0/10. In this example, the network address matches more than one rule. A priority computation can then be performed to determine which of the rules will be enforced. This priority computation could use information in the packet header aside from the network address, or, in another embodiment, a user could define which rule has priority.

The last step 20 involves processing the packet in accordance with the matched pattern. That is, if the rule associated with the matched pattern instructs the packet classifier to drop the packet, then the packet gets dropped.

B. Classifier Identifier Hardware

Figure 4:
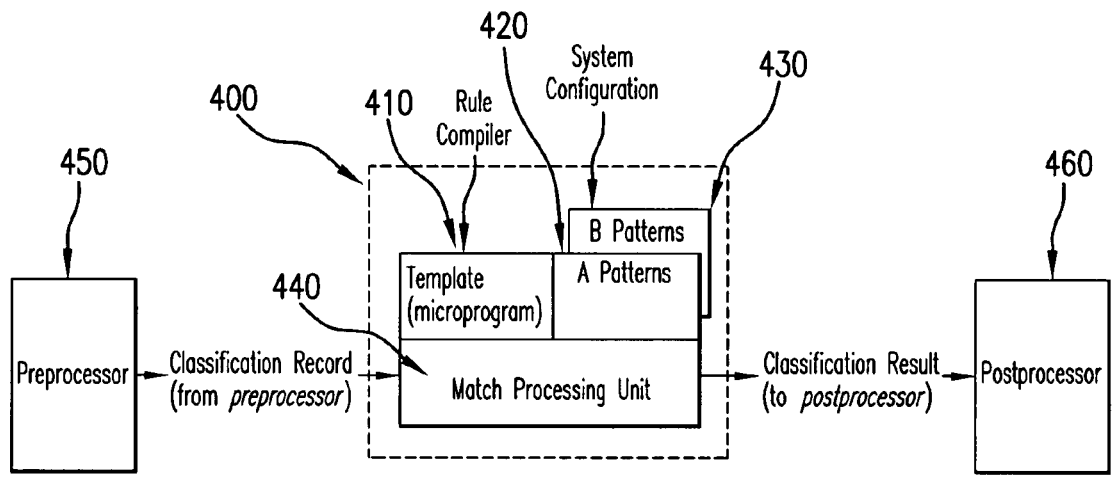
FIG. 4 is a block diagram depicting a classification engine according to one embodiment of the invention.

FIG. 4 depicts one embodiment of a packet classifier according to one aspect of the invention. The broken line encompasses the classification engine 400 of the packet classifier. The embodiment of FIG. 4 can be used to perform the methods for classifying packets described above. Other hardware implementations can also be used to perform the methods outlined above.

Referring to FIG. 4, the classification engine 400 includes a match processing unit 440, a program (template) 410, and pattern sets 420, 430. The match processing unit 410 performs the operations received from the template 410. The template 410 of the classification engine 400 is defined by the user's requirements and maintains the list of operations to be performed by the match processing unit 440. The template 410 encodes the format of the classification record and stores the operations to be performed on the classification record. The template 410 is comprised of rules programmed by a user in a higher level code and then compiled (not shown). The classification record can be a snapshot of the packet header. One of the purposes of the classification record is to deliver the operands to the match processing unit 440.

The pattern memories 420, 430 store the patterns for a particular system configuration. Software drivers (not shown) configure the pattern memories to the classifier engine's 400 template 410 for a given set of rules. Two pattern memories, pattern A 420 and pattern B 430 are maintained in the classification engine 400 to enable seamless updating of the patterns. Either the A or the B patterns 420, 430 can be used to feed the match processing unit 440 at any given time. This allows the other of the patterns 420, 430 to be updated via a processor interface. Once updated, the processor can command the classification engine 400 to switch sets.

In operation, the preprocessor 450 delivers a classification record to the match processing unit 440. The classification record typically contains packet header information, including, for instance, fields such as addresses. Upon receiving instructions from the template 410, the match processing unit 440 compares the designated field(s) in the classification record to the A patterns 420 and sends the classification result to the post processor 460. The post-processing component 460 encodes the highest priority rule that the match processing unit 440 determined for a given header for a given pattern 420, 430. To summarize, packets are received by the preprocessor 450. The packets are then matched with patterns in the classification engine 400, and the matched packets are then processed by a postprocessor in accordance with the rules associated with the matched pattern.

1. Classification Record

Figure 5:
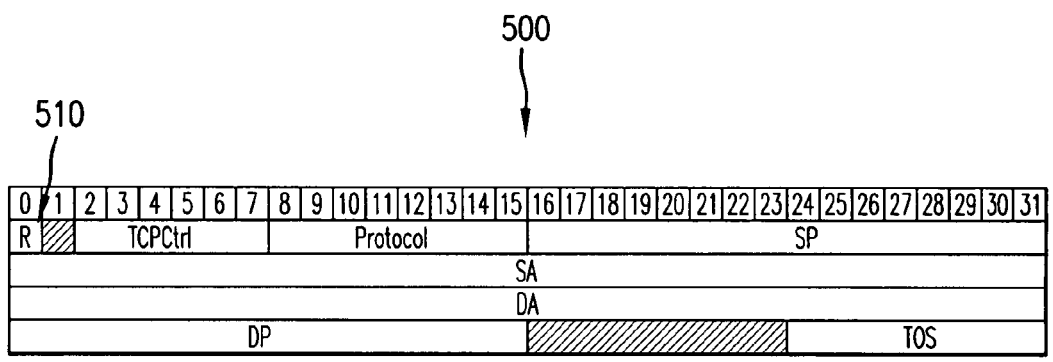
FIG. 5 is a block diagram depicting an example of a TCP/IP classification record.

The classification record is produced from the packet header of the incoming packet by the preprocesser 450. An exemplary classification record 500 having 128 bits is shown in FIG. 5. Two fields within the classification record 500 have significance to the hardware implementation. The R bit 510 is the A/B selector bit, which is used to control the set of instructions applied to the classification record 500. The classification record 500 of FIG. 5 is constructed for TCP/IP classification. This format provides for septuple classification over the fields extracted from IP and TCP packet headers. FIG. 6 is an example of an unformatted 128 bit classification record, which can be formatted in accordance with a user's specifications. The shaded fields of FIG. 6 show where application data may reside within the classification record. FIG. 6 shows an empty classification record 500 of FIG. 5.

Once the classification record is formatted, the operations supported over the various fields are determined. FIG. 7 outlines an exemplary rule template for the classification record 500 depicted in FIG. 5. FIG. 7 is one specific embodiment of how a template can be created for use with a standard TCP/IP header and classification record 500. Field 710 selects which of the septuple fields in the classification record is the operand. Field 710 lists the common fields found in the TCP/IP packet header. For instance, SA stands for source address. DA is an acronym for destination address. Protocol refers to what protocol is used within the packet itself (e.g., TCP). TOS is an abbreviation for Type of Service. SP stands for "source port," and DP stands for "destination port". TCPCtrl is the Transmission Control Protocol's control field.

Operation 720 refers to the operation to be performed on the operand. Common operations can include equality, inequality, greater than, less than, range, and masked equality checking. Equality checking tests whether the bits in the field are identical to a pattern. An inequality check tests whether the field does not match a pattern. A greater than check tests if the field is greater than a specified number (i.e., the pattern). A less than check tests whether a field is less than a pattern. A masked equality check is similar to the equality test except for a preliminary step. The masked equality check first performs a bitwise Boolean AND operation with a first pattern before it tests equality with a second pattern. The operation range check is the combination of greater than and less than operations. It tests whether a field is between two patterns.

Referring to FIG. 7, "# of Header bits" 730 refers to the size of the septuple field in the classification header. For example, TCP/IPv4 uses source and destination addresses of 32 bits. For brevity IP addresses are usually expressed by four bytes (each having 8 bits) separated by decimals. Each byte represents a number between 0 and 255, such as, 128.192.0.1. "# of pattern bits" 740 refers to the number of pattern bits required to perform the operation 720.

The column marked "Notes" 750 in FIG. 7 is used to clarify to the user how the respective pattern bits of column 740 are applied in the respective comparative operation 720. For example, if a rule performs a "masked equality" on the SA field (32 bits) in the classification record, 64 bits (from 740) are required—32 bits for the mask and 32 bits for the equality. The corresponding row 772 in the Notes 750 column explains this. For example, if a masked equality is performed on a hypothetical field that is three bits ("101") long in the classification record, 6 bits are necessary to complete the comparison operation. In the example, the field is "101", the first pattern is "110" and the first field is "100", and the second pattern is "110". Per the functionality of the masked equality, F is AND'd with m in a bit-wise Boolean operation. The result is "100" ("101" AND "100"). The result does not match (equal) n, which is "110".

In the row 758, the corresponding Note 778 instructs the user that, for the operation "range" to be performed on the source port field, 32 bits are required. The operation "Range" tests whether an operand (e.g., the SA field 758) is between two numbers. Ranges require an upper bound (16 bits in length) and a lower bound (16 bits in length) to be performed on (for instance) the source port field 758.

2. Classification Result

When the classification engine 400 reaches a result of the match, this result, called the classification result, is written into the classification record. As depicted in FIG. 8, the classification engine over-writes the lowest 15 bits of the classification record with the classification result 810. Referring to FIG. 8, the shaded fields 820 are unmodified with respect to the classification record delivered to the classification engine 400.

FIG. 9 shows the format of the classification result 900. The classification result 900 includes three fields: M 910, set 920, and filter 930. The M field 910 is a single bit field and indicates whether a match has occurred (when set) or not (when clear).

The set field 920 is five bits in length. The set field 920 indicates which filter set has matched. A filter set is a group of up to 512 rules (in this exemplary description). Filter sets are separated by a special instruction in the template called the rule separator.

This embodiment of the packet classifier maintains a database of rules. Rules are prioritized by a network manager (or protocol) in a rule database such that when a packet arrives at the packet classifier, rules are applied in a predetermined sequence. Thus, if a packet header matches two or more rules, the rule with the highest priority is applied.

The filter field 930 is nine bits in length in this embodiment. The filter field 930 can be used to report the result of a priority arbitration. For example, when the classification engine matches the associated identifier associated with an incoming packet to one or more rules, a question of priority arises. The classification engine (per the configuration set by the network manager) determines which filter is to be applied to the incoming packet. The filter field 930 is the result of the priority determination and indicates the highest priority filter that matched (if any).

3. Instruction Set

Referring to FIG. 10, the instruction set is the combination of the template and the pattern set designated by the R bit. In the present embodiment, the classification engine's instruction size is 522 bits. Instruction memory is mirrored in order to enable seamless updates of the classification program. In other words, a second instruction set and pattern set are redundantly maintained in the classification engine. This enables the user to take either of the sets out of service to implement changes while not interrupting service.

FIG. 10 shows the format of the instructions. The instruction 1000 has three fields. The instruction 1000 includes the Opcode field 1010, the HeaderBitSel field 1020, and Pattern field 1030. The Opcode field 1010 refers to a three bit opcode that denotes the operation to be performed.

Some of the common operations include "Field Separator", "Less than or Equal to", "Greater than or Equal to", "Equal to", "Rule Separator", "Less than or Equal to Priority", "Greater than or Equal to Priority", and "Equal to Priority."

The Header Bit Select (HeaderBitSel) field 1020 selects a bit from the classification record as the source of one of the operands for the instruction. Each of the 512 pattern bits is provided as the source of the second operand with one bit corresponding to each of 512 filters that are compared simultaneously.

4. Synthesized Operations

One can synthesize other operations from this basic set, which may be useful to a particular application. For example, a Boolean "OR" instruction can be synthesized by a greater than or equal to (GE) instruction with Header Bit Select (HeaderBitSel) selecting the bits to be OR'd, where the patterns for successive OR instructions are all zeros except for the last OR instruction in the sequence, which must have a pattern of all ones.

The classification engine of the present embodiment can be superior in nature to a Ternary Content Addressable Memory (TCAM) used in packet classification for several reasons. In particular, the ability to express the Boolean logic "OR" operation cannot be done in a TCAM without using multiple TCAM entries. Also, the ability to apply a mask to a field as opposed to requiring one to be applied to every bit leads to more efficient utilization of pattern memory. Furthermore, the present embodiment has a great ability to support ranges. For example, a common port expression is "greater than 1023" in rule sets. The implementation of a rule incorporating this port expression on a TCAM would require 6 TCAM entries.

5. Classification Program Structure (Template)

FIG. 12 shows the general structure of a classification program. A template 1210 is defined by the sequence of Opcodes and Header Bit Select (HeaderBitSel) fields of the instructions prior to and including that template's rule separator instruction. The rule separator instruction defines the boundary of a filter set. All filters that can be represented with the same template are grouped into the filter set and refined with respect to their patterns. A single template is applied to up to 512 different filters. A template can be as large as 384 instructions or as small as 32.

6. Field Compression

The task of associating a forwarding path with a destination prefix or a DMAC address is a special (restricted) form of classification, which is typically a subset of the advanced N-tuple classification supported by the classification engine. In another embodiment of the invention, field compression is implemented as described above in section A. The principals described in section A enable a packet classifier to take advantage of field compression of the fields to be classified, as well as providing a mechanism to expand the potential number of rules supported by the system. The technique described in section A is outlined as it applies to field compression for completeness.

As the preprocessor executes its lookup functions (e.g., in a Longest-prefix Match in one embodiment), it populates the classification records with associated identifiers. For IPv4 addresses the required representation in the classification record (that is, of the associated identifier) drops from 64 bits down to 20 bits—a significant gain of 44 bits. For MAC addresses the required representation in the classification record drops from 96 bits down to 20 bits—an even more significant gain of 76 bits. And for IPv6 addresses, the required representation drops from 256 bits to 20 bits. This substitution is called field compression.

FIG. 13 shows an example of a septuple IPv4 classification record with field compression of the source and destination prefix addresses. Referring to the shaded regions 1320 of FIG. 13, fifty bits remain uncommitted in this structure. These fifty bits can be used to provide additional fields for classification.

FIG. 14 shows an example of an 11-tuple Ethernet frame classification record that provides for L3-4 classification over an L2 bridged frame. By adding a T (type) bit the Ethernet classification record can be assumed to be identical to the IPv4 record with the type bit distinguishing one from the other. This technique is useful to simplify rule compilation.

7. Optimizations

Some optimizations can be executed on templates to provide a data dependent reduction in template size. If the pattern for an LE (less than or equal to) instruction is equivalent to that of a GE (greater than or equal to) instruction for the same header bit, then the pair may be replaced by an EQ (equal to) instruction with the same pattern. If the pattern associated with an LE instruction is all ones, then that LE instruction may be eliminated. If the pattern associated with a GE instruction is all zeroes, then that GE instruction may be eliminated. If there is a MASK instruction with all zero pattern bits, then the MASK and its corresponding DATA instructions can be eliminated.

These optimizations enable simple transformations of the classification program template with respect to the patterns provided. As the template is reduced in size, additional template instructions are enabled. This, in turn, enables more filters to be specified. However, arbitrary rule ordering will generally not enable such optimizations. Therefore, this can require the application of some heuristics to increase the likelihood that one of the above optimizations may be applied.

8. Architecture of a Classification Engine

Figure 15:
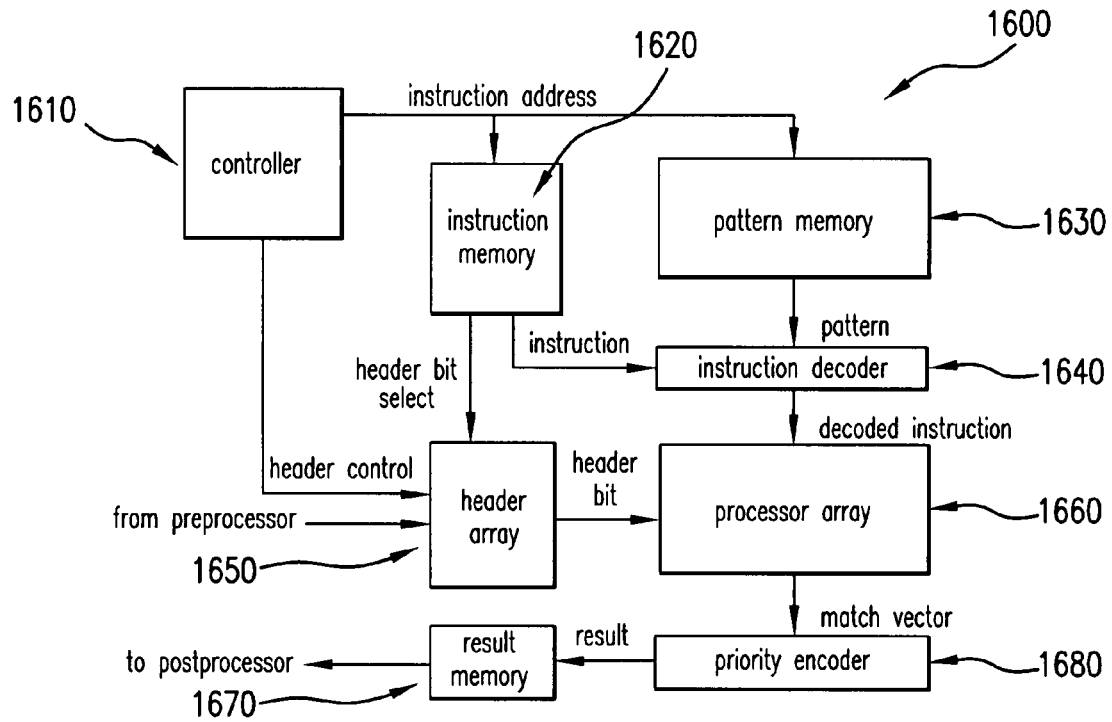
FIG. 15 is a flow chart of one embodiment of the classification engine according to the invention.

The following implementation can be used in one embodiment of the invention. The scope of the architecture of the invention is not limited to this embodiment. Referring to FIG. 15, a block diagram shows the major components of the packet classification engine 1600. The components include a controller 1610, an instruction memory 1620, one or more pattern memories 1630, an instruction decoder 1640, a header array 1650, a processor array 1660, a result memory 1670, and a priority encoder 1680.

A preprocessor (not shown) formats classification records of incoming packets and writes several fields of the classification records to the header array 1650. The number of fields written to the header array 1650 determines the packet processing rate of the packet classifier. For example, a packet processing rate of 20 million packets per second requires that at least one classification record needs to be processed every 50 nanoseconds. Given 32 classification records, the processor array can spend up to 1600 nanoseconds processing all records in parallel. Given a 4 nanosecond clock cycle time, up to 400 instructions may be applied to each classification record. As the number of records maintained in the header array is increased, the number of instructions that may be applied to each record is also increased.

The instruction memory 1620 and pattern memory 1630 are addressed by a common controller 1610 (e.g., a counter). An instruction consists of a header bit number and an opcode. The header bit is used by the header array 1650 to present the appropriately numbered bit to the processor array 1660. The opcode determines what action each processing element is to take with respect to the current rule data bit from the data memory in conjunction with the current header data bit from the header array 1650. The major components of the block diagram shown in FIG. 15 are described below.

a. Controller

The controller 1610 provides timing for the data path elements. It maintains an instruction pointer which counts modulo the total number of instructions. This pointer is used to address the instruction memory 1620 and pattern memory 1630. The controller also manages the timing of the header array 1650 such that the header context is switched appropriately at the beginning of the instruction sequence.

b. Instruction and Pattern Memories

The instruction memory 1620 and pattern memory 1630 are comprised of Static Random Access Memory (SRAM) devices in this embodiment. In one embodiment, a common address is provided by the controller 1610. The data at the addressed location is read and delivered to the instruction decoder 1640 and header array 1650. Other RAM devices, such as Dynamic Random Access Memory (DRAM), may be substituted in the present embodiment.

c. Instruction Decoder

Figure 17:
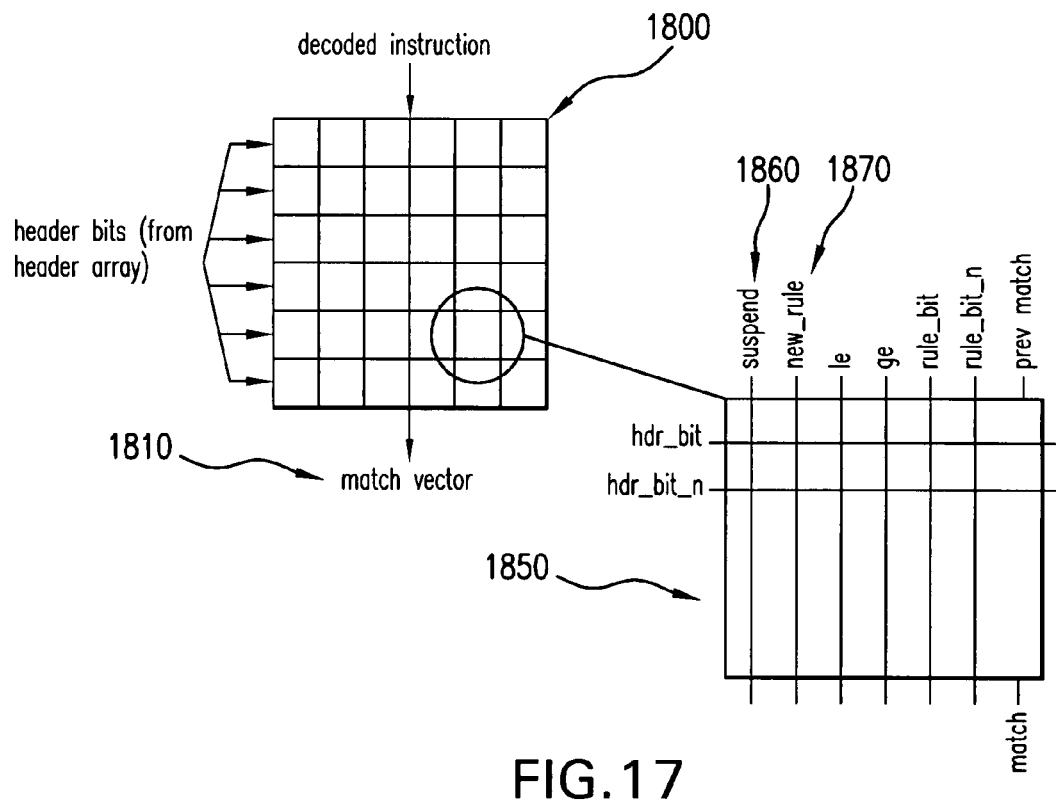
FIG. 17 is a block diagram of the processor array structure shown in FIG. 15 of the classification engine.

The instruction decoder 1640 is responsible for decoding the instructions received from the instruction memory 1620 such that appropriate control signals are developed for the processor array 1660. The relevant control signals are shown in FIG. 17, Processor Array Structure, which is described below.

d. Header Array

Figure 16:
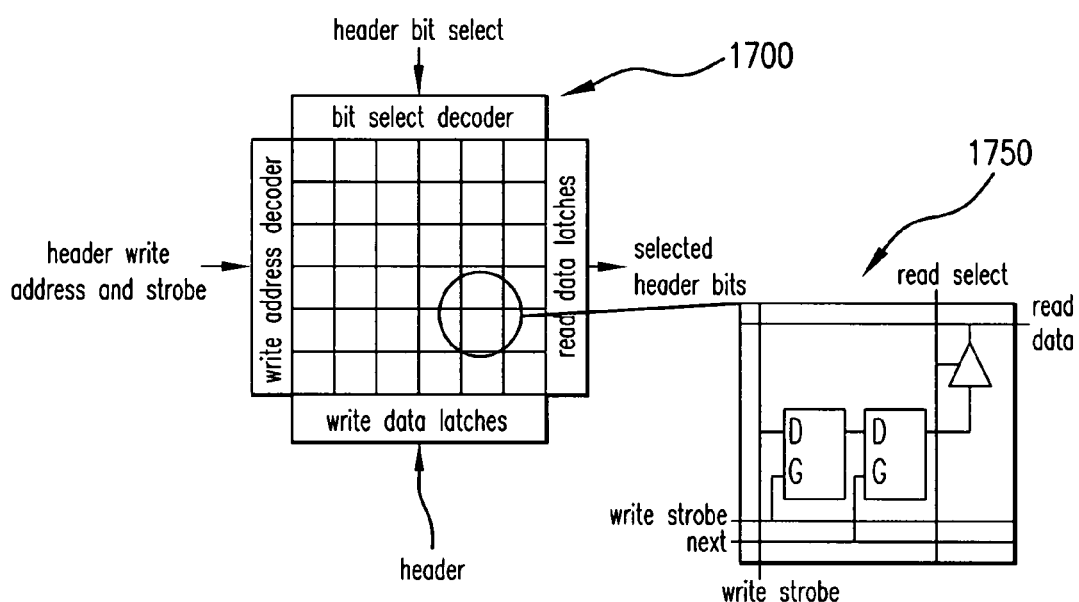
FIG. 16 is a block diagram of the header array structure depicted in FIG. 15 of the classification engine.

FIG. 16 shows the structure of the header array 1700. Classification records are written to the header array 1650 in a single cycle. A single header bit is simultaneously read from each header under control of the current instruction. As such, the header array 1650 behaves as a transposition memory. The contents of the header array can be used to determine a subset of the instructions in the classification program to apply to the current set of headers. Such selection can be either fixed or programmable, which can enable seamless updating of the classification program and can effectively increase the classification program size.

e. Processor Array

Referring to FIG. 17, the structure 1800 of the processor array 1660 has as many rows as there are headers to process and as many columns as there are rules to be processed in parallel. It can consist of thousands of processing elements 1850 (PEs) depending on the requirements. In a single cycle, each processing element 1850 receives a bit from the pattern memory and an appropriate bit from the header array (as directed by the instruction) as well as a command which indicates the match that is sought between the rule and header bits.

Figure 18:
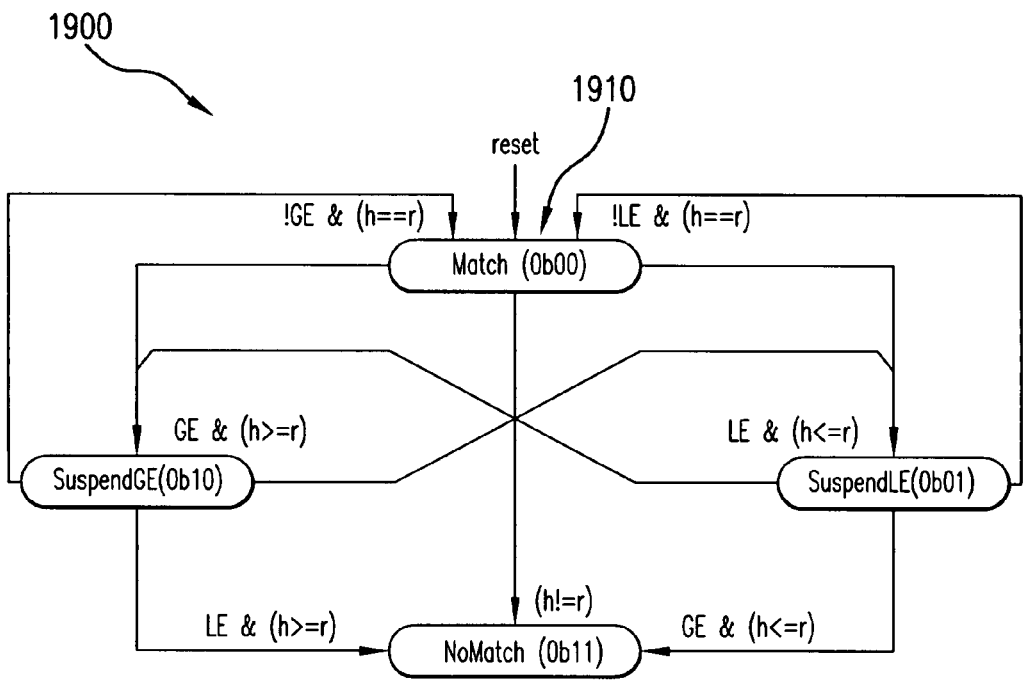
FIG. 18 is a flow chart of the finite state diagram of the finite state machine illustrated in FIG. 17.

A processing element 1850 is a four-state finite state machine (FSM) as depicted by the state diagram in FIG. 18. Although not shown in the state flow of FIG. 18, the finite state machine 1850 (FIG. 17) can be suspended 1860 as directed by the instruction decoder 1640. This suspension can be achieved by clock gating or actively in the next state logic—the former leading ultimately to less logic overall.

Upon the assertion of the new rule signal 1870, the match state 1910 for an entire column is loaded into a shift register (not shown) and the finite state machine 1850 is reset to the match state. In subsequent cycles, the shift register shifts these results to the priority encoder 1680 delivering a match. This includes shifting the vector 1810 for each header (row) on every cycle until the shift register has been completely flushed.

f. Priority Encoder

The priority encoder identifies the highest priority element set in the match vector and writes the result to the result memory.

The packet classifier detailed above can be used in a variety of implementations. In one implementation, it can be cascaded so that one instance of the device is used to feed another instance of the device.

Any references to greater and lesser, front and back, right and left, top and bottom, upper and lower, and horizontal and vertical are intended for convenience of description, not to limit the present invention or its components to any one relational, positional or spatial orientation. All dimensions of the components in the attached FIG.s may vary with a potential design and the intended use of an embodiment of the invention without departing from the scope of the invention.

While the present invention has been described with reference to several embodiments thereof, those skilled in the art will recognize various changes that may be made without departing from the spirit and scope of the claimed invention. Accordingly, the invention is not limited to what is shown in the drawings and described in the specification, but only as indicated in the appended claim.

What is claimed is:

1. A method for classifying an incoming packet, comprising:
   maintaining a database associated with one or more patterns of fields, wherein the database is developed by:
      mapping each pattern to a unique numeric identifier, wherein the number of unique numeric identifiers is equal to the number of patterns, and wherein a size of each unique numeric identifier is less than the field of each pattern; and
      determining a range of one or more of the unique numeric identifiers to be associated with each pattern, wherein the range is bounded by a minimum unique numeric identifier and a maximum unique numeric identifier;
   using a field of the incoming packet to determine an associated identifier for that field, wherein the associated identifier is equal to one of the unique numeric identifiers;
   matching the associated identifier assigned to the field of the incoming packet with one or more of the ranges; and
   determining how to process the incoming packet based on the matching.

2. The method of claim 1, wherein the fields of the patterns and the fields of the incoming packets are network addresses.

3. The method of claim 1, wherein the incoming packet has more than one field, and wherein the act of using a field of the incoming packet to determine an associated identifier is carried out for each of the fields of the incoming packet.

4. The method of claim 1, further comprising:
   if the associated identifier matches one of the ranges bounded by different unique numeric identifiers, determining priority among the unique numeric identifiers in the range and selecting the highest priority for processing.

5. The method of claim 1, wherein the database is a trie.

6. The method of claim 5, wherein the size of each numeric identifier is equal to the largest integer greater than $\log_2 N$, where N is the number of unique patterns.

7. The method of claim 5, wherein the trie is developed using a depth-first, binary traversal of the patterns.

8. The method of claim 1, wherein using a field of the incoming packet to determine an associated identifier includes using a longest-prefix matching (LPM) process.

9. The method of claim 1, further comprising:
   maintaining a second database associated with the one or more patterns of fields; and exchanging the second database for the database.

10. The method of claim 1, wherein using a field of the incoming packet to determine an associated identifier includes looking up the associated identifier using addressable memory.

11. The method of claim 1, wherein the database is developed by constructing a trie, wherein leaves of the trie are developed by:
    selecting a highest bit to correspond to a root leaf; and
    parsing through one of the fields of one of the patterns from left to right to develop child leaves.

12. A method for developing a database of patterns of fields for use in packet classification, comprising:
    mapping each pattern to a unique numeric identifier, wherein the number of unique numeric identifiers is equal to the number of patterns, and wherein a size of each unique numeric identifier is less than the field of each pattern;
    determining a range of one or more of the unique numeric identifiers to be associated with each pattern, wherein the range is bounded by a minimum unique numeric identifier and a maximum unique numeric identifier;
    using a field of an incoming packet to determine an associated identifier for that field, wherein the associated identifier is equal to one of the mapped unique numeric identifiers in the database; and
    matching the associated identifier assigned to the field of the incoming packet with one or more of the ranges.

13. The method of claim 12, further comprising;
    building a trie based on the fields of the patterns to develop the database.

14. The method of claim 13, wherein mapping each pattern includes associating one of the unique numeric identifiers to each terminal node of the trie.

15. An apparatus for classifying an incoming packet, comprising:
    a database associated with one or more patterns of fields, wherein the database is developed by:
       mapping each pattern to a unique numeric identifier, wherein the number of unique numeric identifiers is equal to the number of patterns, and wherein a size of each unique numeric identifier is less than the field of each pattern; and
       determining a range of one or more of the unique numeric identifiers to be associated with each pattern, wherein the range is bounded by a minimum unique numeric identifier and a maximum unique numeric identifier;
    means for using a field of the incoming packet to determine an associated identifier for that field, wherein the associated identifier is equal to one of the unique numeric identifiers;

means for matching the associated identifier assigned to the field of the incoming packet with one or more of the ranges; and means for determining how to process the incoming packet based on the matching.

* * * * *